(12) United States Patent
Wittig et al.

(10) Patent No.: US 7,435,922 B1
(45) Date of Patent: Oct. 14, 2008

(54) OVER-MOLDED KEYPAD AND METHOD OF MANUFACTURE

(75) Inventors: J. Michael Wittig, West Chester, PA (US); John Barrella, Horsham, PA (US)

(73) Assignee: Animas Corporation, West Chester, PA (US)

( * ) Notice: Subject to any disclaimer, the term of this patent is extended or adjusted under 35 U.S.C. 154(b) by 0 days.

(21) Appl. No.: 11/955,663

(22) Filed: Dec. 13, 2007

(51) Int. Cl.
*H01H 13/70* (2006.01)
(52) U.S. Cl. .......................... 200/516; 29/622
(58) Field of Classification Search ............ 29/622; 200/512–517, 296, 341; 341/22; 345/168, 345/169
See application file for complete search history.

(56) References Cited

U.S. PATENT DOCUMENTS

| | | | | |
|---|---|---|---|---|
| 4,046,981 A | * | 9/1977 | Johnson et al. | 200/516 |
| 4,194,097 A | * | 3/1980 | Bradam | 200/5 A |
| 4,349,712 A | * | 9/1982 | Michalski | 200/513 |
| 4,471,176 A | * | 9/1984 | Inaba | 200/5 A |
| 5,089,671 A | * | 2/1992 | Ranetkins | 200/5 A |
| 5,298,706 A | * | 3/1994 | English et al. | 200/517 |
| 6,768,074 B2 | * | 7/2004 | Iwama | 200/515 |
| 7,015,408 B2 | * | 3/2006 | Hirahata et al. | 200/310 |
| 7,094,985 B2 | * | 8/2006 | Kobayashi et al. | 200/516 |
| 7,350,285 B2 | * | 4/2008 | Mitsuoka et al. | 29/622 |

* cited by examiner

*Primary Examiner*—Michael A Friedhofer
(74) *Attorney, Agent, or Firm*—Wayne C. Jaeschke, Jr.

(57) ABSTRACT

Described is a keypad and its method of manufacture. In one embodiment, a keypad is provided that includes a substrate having a plurality of donut-shaped recesses located at each site of a button for inputting user information, a plurality of cushions each filled with an incompressible fluid (e.g., water), a flex circuit layer, a plurality of metal membranes and an over-molded thermoplastic elastomer layer. During the over-molding of the thermoplastic elastomer layer, the plurality of cushions filled with an incompressible fluid prevents collapse of the space between the flex circuit layer and the plurality of metal membranes. After the layers of the keypad are assembled, the incompressible fluid is removed which leaves a space between the flex circuit layer and the plurality of metal membranes.

6 Claims, 7 Drawing Sheets

FIG. 1C
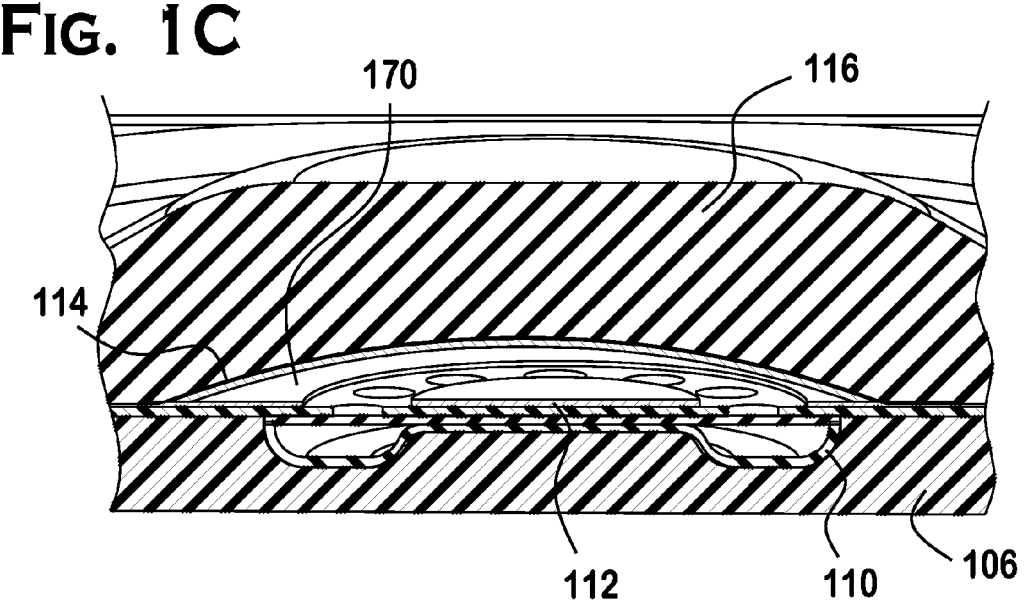
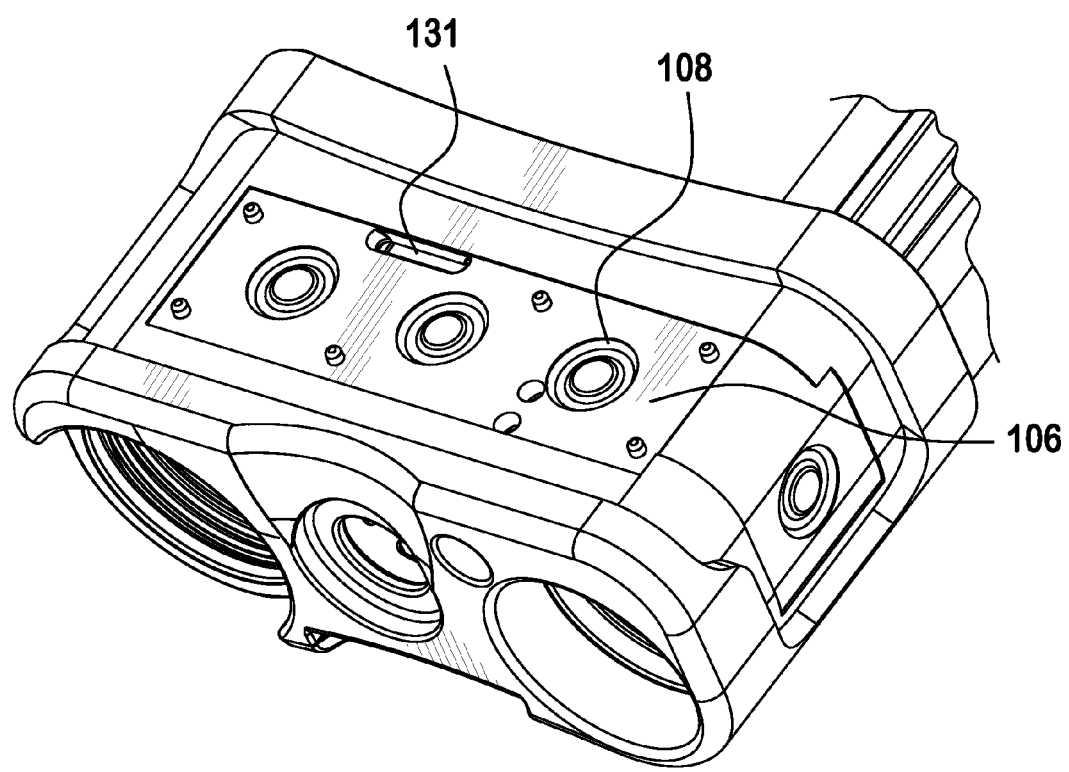
FIG. 2

OVER-MOLDED KEYPAD AND METHOD OF MANUFACTURE

FIELD OF THE INVENTION

The present invention relates, in general, to keyboards and, more particularly, to over-molded keyboards and methods for their manufacture.

BACKGROUND OF THE INVENTION

In general, electronic devices may use a keypad to enter information into the device. Examples of electronic devices using a keypad include cell phones, telephones, personal data assistants, computers, mini-computers, faxes and hand-held medical devices such as glucose meters and drug infusion pumps. In general, the keypad for such electronic devices includes a circuit board, a frame or substrate and a set of key switches mounted in holes on the frame. When a key switch is clicked, the space between the key switch and the circuit board is closed and a contact at the circuit board is triggered that causes the circuit board to output a corresponding electrical signal.

Gaps may exist between the components of the key switches and the frame, or substrate, allowing ingress of external environmental contaminants such as water or hand lotion into the inside of the keypad assembly which can adversely affect the performance of the keypad. Over-molding processes are generally used to seal the gaps that may exist between the components of the key switches and the frame. However, during the over-molding process, the over-molded material may exert enough pressure on the components of the key switches that the space between the key switches and the circuit board is flattened such that the keypad will not function. Also, materials such as silicone-containing materials used in keypads, bonded onto a substrate do sometimes not fully adhere to a plastic frame, which may allow external contaminants to enter the keypad assembly.

Therefore, applicants recognize a need for a manufacturing method in which the space between the key switch (switch cavity) and the circuit board is maintained during the over-molding process. Applicants also recognize a need for an over-molded layer material that will form a tight seal over the keypad components and the frame or substrate.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 1A, 1B and 1C are perspective, exploded and cross-sectional views of a keypad according to an exemplary embodiment of the present invention;

FIG. 2 is a perspective view of a substrate for a keypad according to an exemplary embodiment of the present invention;

DETAILED DESCRIPTION OF ILLUSTRATIVE EMBODIMENTS OF THE INVENTION

Figure 1A:
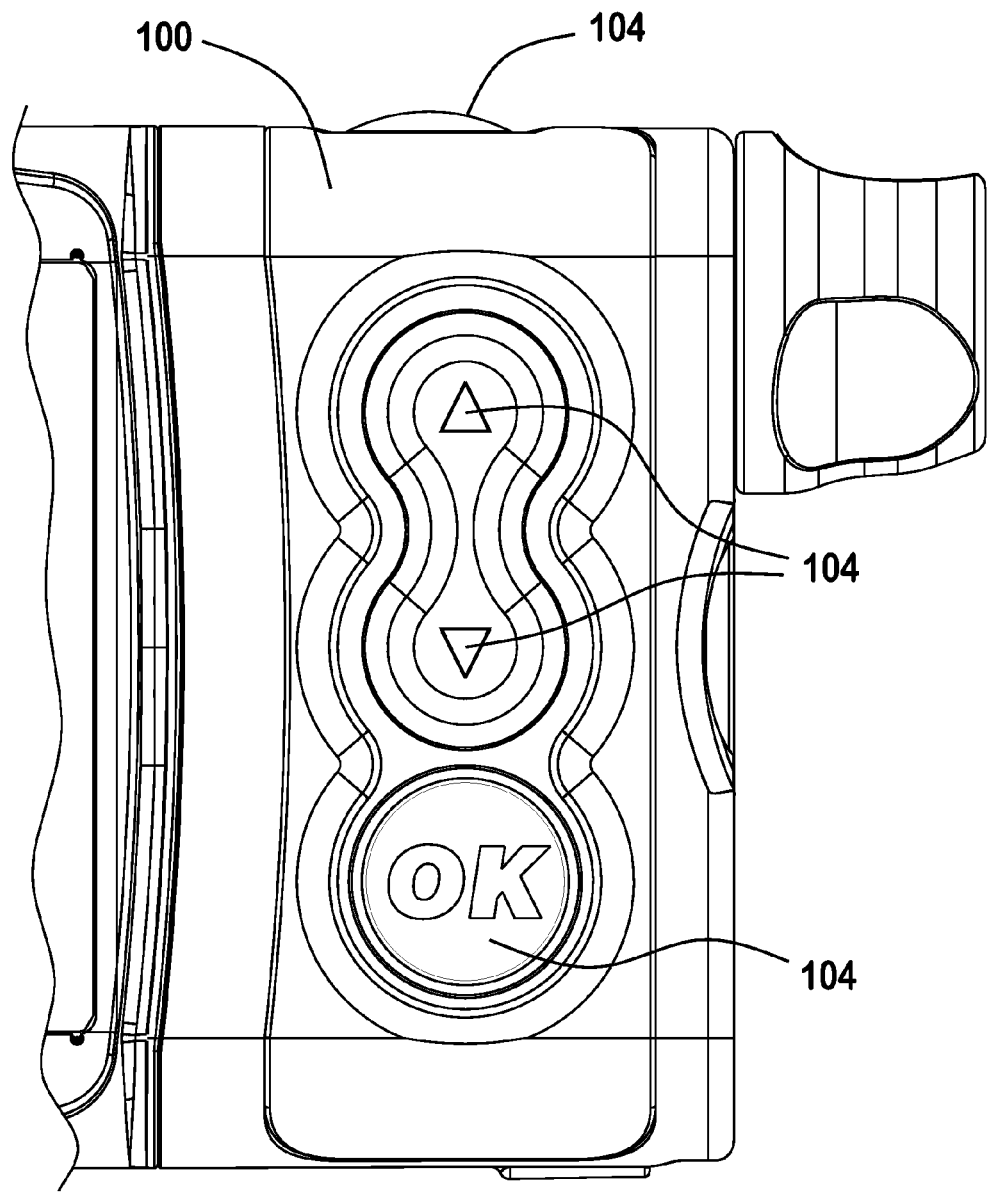
Figure 1B:
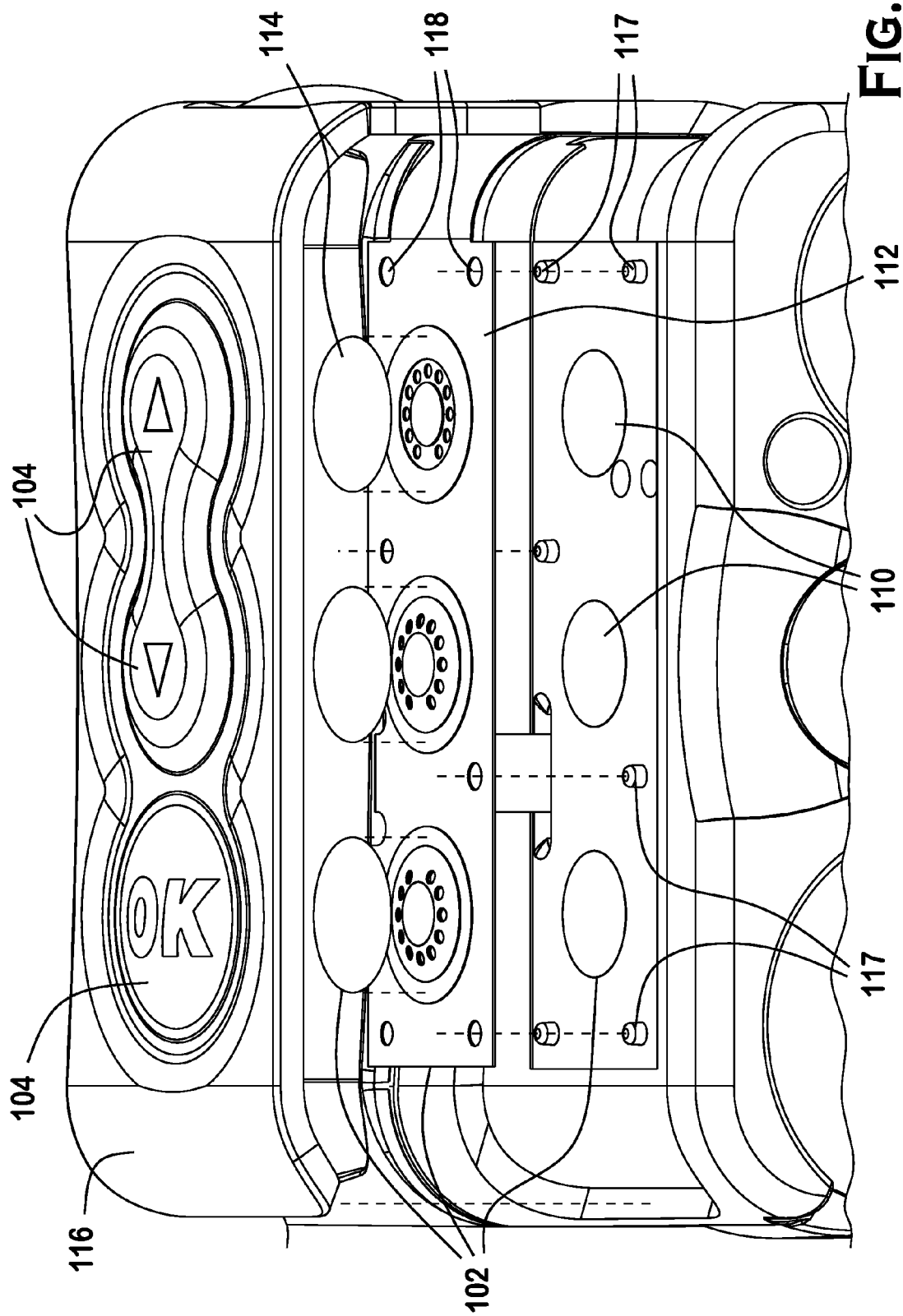

FIGS. 1A-1C illustrate a keypad 100 according to an exemplary embodiment of the present invention. The keypad 100 includes a plurality of switch assemblies 102 each located at a site of a button 104 for inputting user information. Each of the switch assemblies 102 includes a substrate 106 having a donut-shaped recess 108 (shown in FIG. 2) in which a cushion 110 is adhered, a flex circuit layer 112 disposed on all of the cushions 110, a plurality of metal membranes 114 at least partially adhered to the flex circuit layer 112 and an over-molded thermoplastic elastomer layer 116 disposed on the plurality of metal membranes 114. The over-molded thermoplastic elastomer layer 116 is also circumferentially continuously disposed on the substrate 106.

FIG. 1B: The substrate 106 includes a plurality of swage pins 117 that each engages an opening 118 in the flex circuit layer 112. The substrate 106 may be formed of a durable plastic material such as polycarbonate.

Each of the plurality of cushions 110 may be formed of an elastomeric polymer material such as, for example, a thermoplastic urethane or a rubber material. Each of the plurality of cushions 110 may be filled with an incompressible liquid such as water that is removed immediately after the molding of the keypad 100, which will be described with reference to FIGS. 7-8 below.

Figure 3:
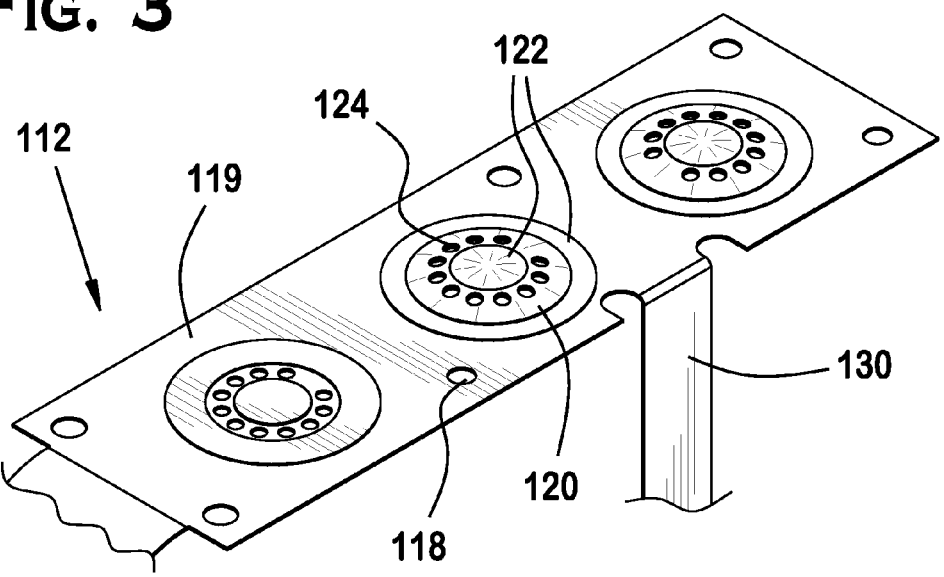
FIG. 3 is a perspective view of a first surface of a flex circuit layer according to an exemplary embodiment of the present invention.

Referring to FIG. 3, the flex circuit layer 112 includes a first surface 119 having a plurality of key domes 120 each having at least two conductive regions 122 and a plurality of holes 124 to facilitate flexible forming of the key domes 120 during molding. The key domes 120 may flex a distance of typically about 0.5 millimeter, or 0.02 inch.

Figure 4:
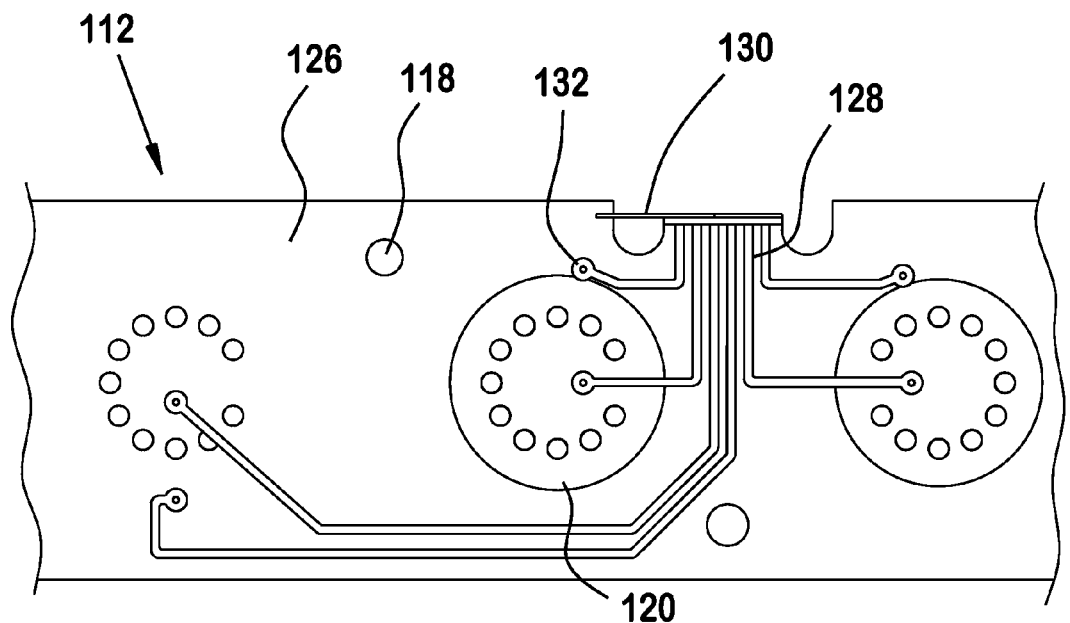
FIG. 4 is a plan view of a second surface of the flex circuit layer shown in FIG. 3 according to an exemplary embodiment of the present invention.
Figure 5:
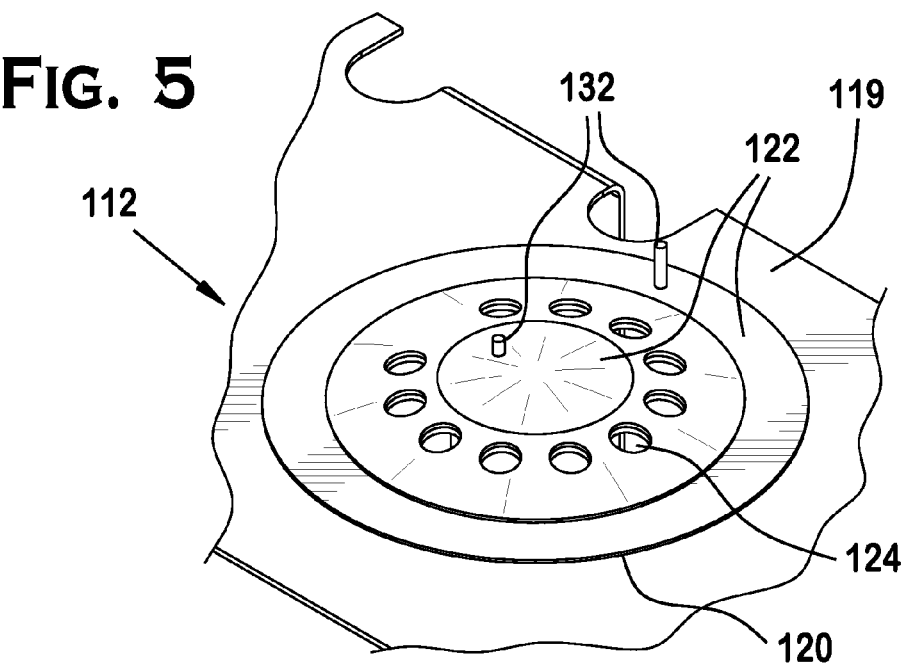
FIG. 5 is a close-up perspective view of a key dome region on the first surface of the flex circuit layer according to an exemplary embodiment of the present invention.

As illustrated in FIGS. 4 and 5, the flex circuit layer 112 further includes a second surface 126 having a plurality of conductive traces 128 and a flex tab 130 that fits into a slot 131 in the substrate 106 (FIG. 2). Each of the plurality of conductive traces 128 is electrically connected to a conductive region 122 on the first surface 119 of the flex circuit layer 112 by a feed 132 (shown for visualization only). The tab 130 electrically interconnects the flex circuit layer 112 to the device to be controlled by the keypad 100. The flex circuit layer 112 may be formed from deformable plastic material such as, for example, Mylar. The conductive regions 122 and traces 128 may be formed of carbon, silver, gold, copper, brass, aluminum or other suitable electrically conductive material. The conductive regions 122 and traces 128 may be deposited onto the flex circuit layer 112 using a technique known to those skilled in the art such as, but not limited to, photo-etching, plating, or adhering a conductive material, such as a thin plate of metal, onto a substrate with adhesive.

Each of the plurality of metal membranes 114 are commercially available thin steel discs (from Snaptron, Inc.), commonly used in keypad designs to maximize keystroke feedback.

The over-molded layer 116 may be formed of elastomeric polymer materials such as, for example, Monprene® MP-2730 thermoplastic elastomer (from Teknor Apex Company, RI, USA) with a hardness of about 30 Shore A to Texin® 245 (from Bayer Material Science AG, Germany with a hardness of 45 Shore D, depending on preference and keypad design.

Figure 6:
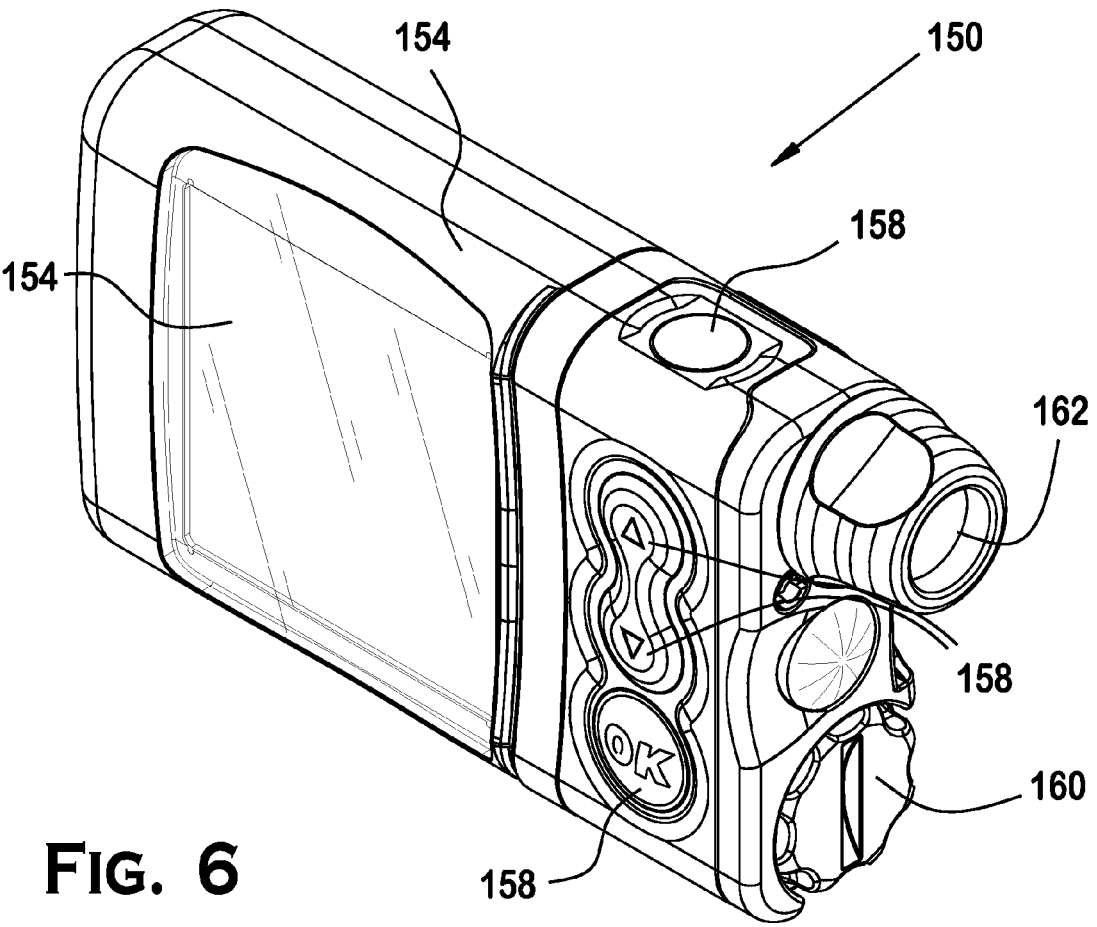
FIG. 6 is a perspective view of a drug infusion pump that is suitable for use with embodiments of the present invention.

The keypad 100 of the present invention may be used in a variety of electrical or electronic devices including, but not limited to, cell phones, telephones, personal data assistants, computers, mini-computers, faxes and hand-held medical devices such as glucose meters and drug infusion pumps. An exemplary embodiment of a drug infusion pump 150 (e.g., an insulin pump) that may incorporate a keypad of the present invention is illustrated in FIG. 6. The drug infusion pump 150 includes a housing 152, a display 154 for providing operational information to the user, a keypad 156 with a plurality of navigational buttons 158 for the user to input information, a battery in a compartment (not shown) with a cap 160 for providing power to the drug infusion pump 150, processing electronics (not shown), a drug delivery mechanism (e.g., an insulin pump and drive mechanism; not shown) for forcing a drug from a cartridge in a chamber through a side port 162 connected to an infusion set (not shown) and into the body of the user.

Figure 7:
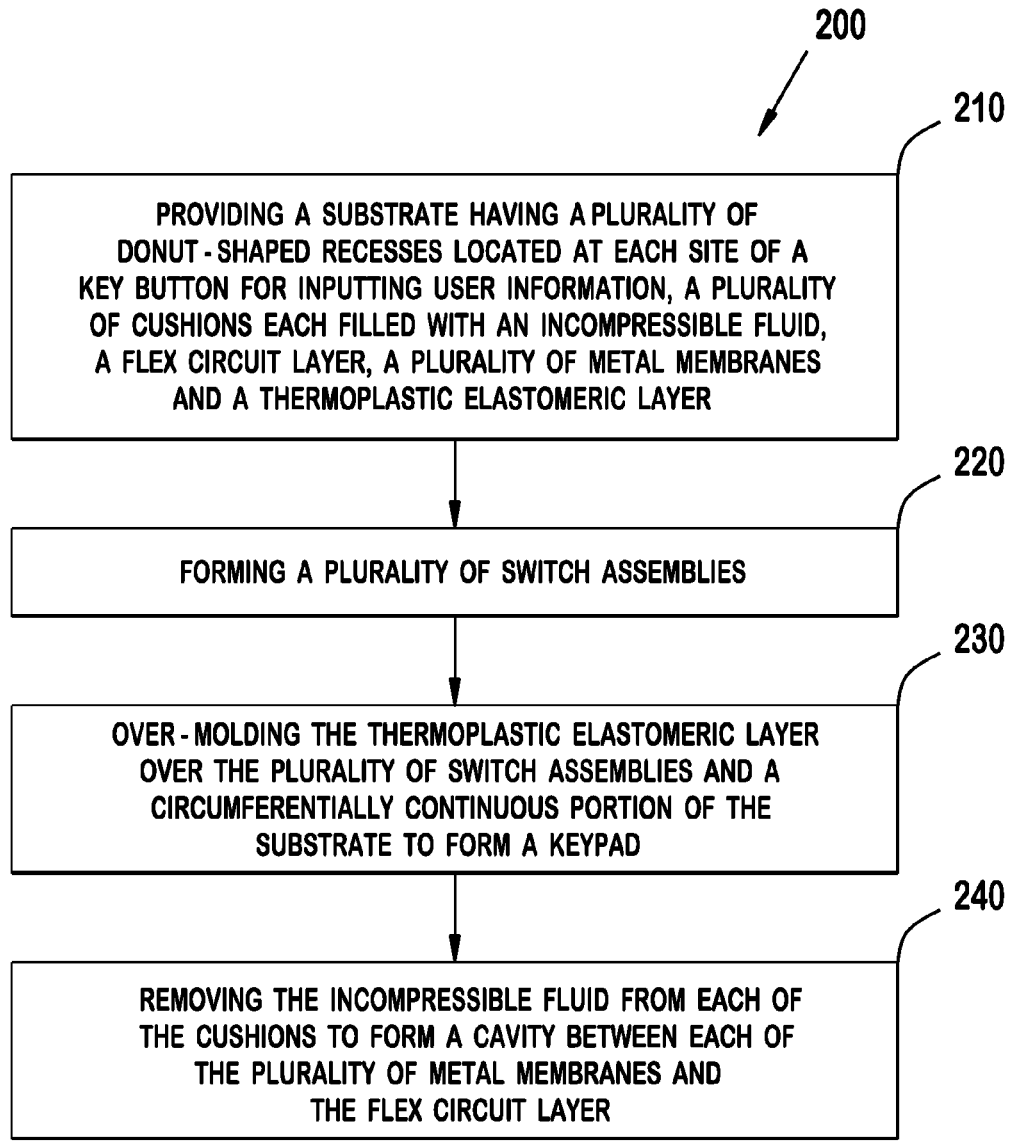
FIG. 7 is a flow diagram illustrating a sequence of steps in a method for forming a keypad according to an exemplary embodiment of the present invention.

FIG. 7 is a flow diagram illustrating a method 200 for forming a keypad according to an exemplary embodiment of the present invention. As set forth in step 210, the method 200 includes providing a substrate 106 having a plurality of donut-shaped recesses 108 located at each site of a button 104 for inputting user information, a plurality of cushions 110 each filled with an incompressible fluid (e.g., water), a flex circuit layer 112, a plurality of metal membranes 114 and a thermoplastic elastomer layer 116.

The next step of the subject method includes forming a plurality of switch assemblies 102 by adhering a cushion 110 to each of the plurality of donut-shaped recesses 108 in the substrate 106, placing a flex circuit layer 112 above all of the cushions 110, engaging each of the openings 118 in the flex circuit layer 112 with a pin 117 on the substrate 106, at least partially adhering the plurality of metal membranes 114 to the flex circuit layer 112 and swaging the plurality of pins 117 on the substrate 106 to the plurality of switch assemblies 102 (refer to step 220). Each cushion 110 may be adhered to a recess 108 in the substrate 106 and the plurality of metal membranes 114 may be at least partially adhered to the flex circuit layer 112 with, for example, Mylar adhesive tape.

Figure 8:
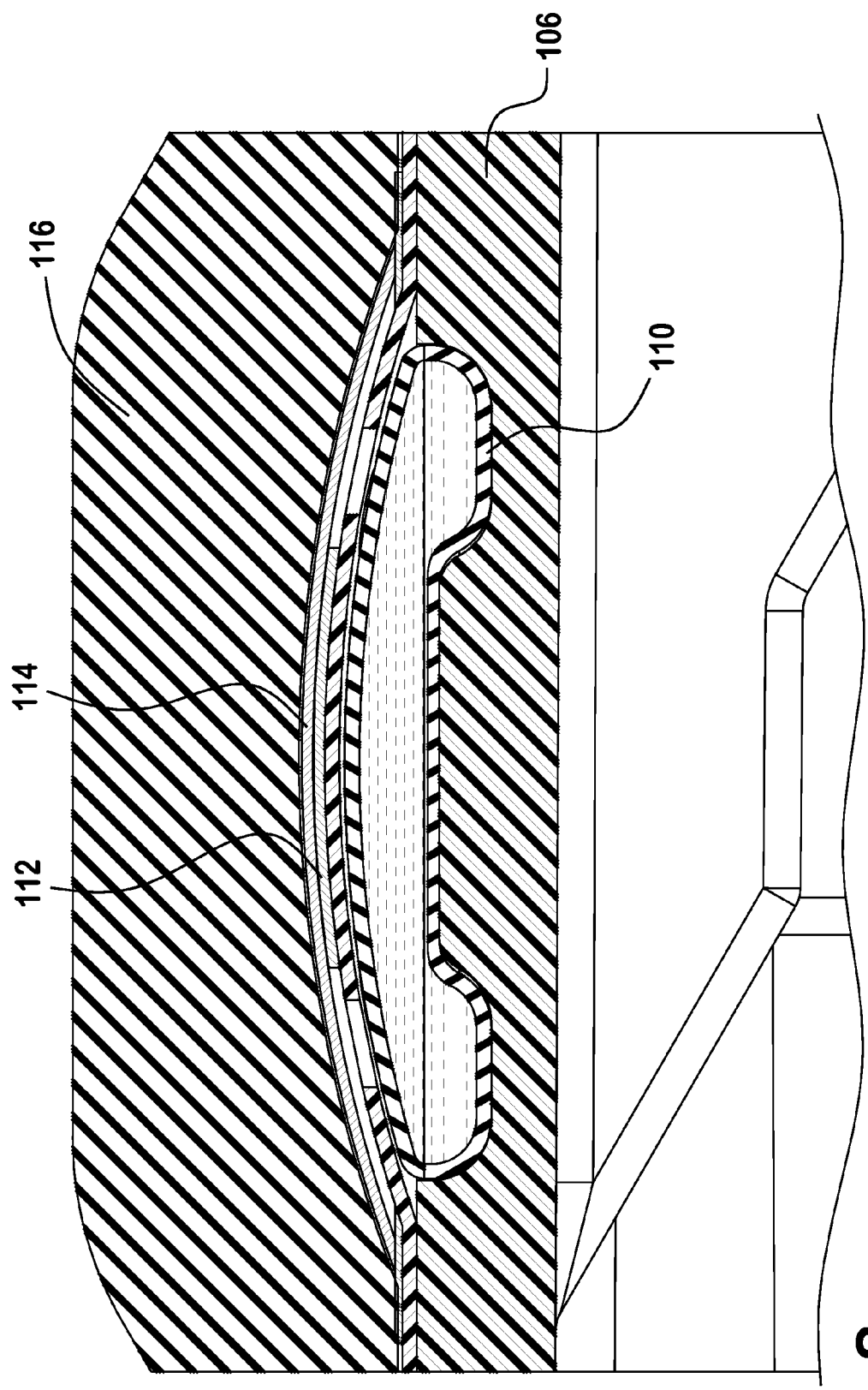
FIG. 8 is a cross-sectional close-up view of a keypad button with cushion prior to deflation of the cushion according to an exemplary embodiment of the present invention.

As set forth in step 230, over-molding the thermoplastic elastomer layer 116 over the plurality of switch assemblies 102 and a circumferentially continuous portion of the substrate 106 then forms a keypad 100 (see FIG. 8). During the over-molding process, the thermoplastic elastomer layer 116 bonds with the circumferentially continuous portion of the substrate 106, forming a hermetic seal over the plurality of switch assemblies 102. Injection molding processes such as insert molding, or two-shot over-molding may be used to form the thermoplastic elastomer layer 116 over the plurality of switch assemblies 102.

In the last step of the subject method, a space 170 is formed between each of the plurality of metal membranes 114 and the flex circuit layer 112 by removing the incompressible fluid from each of the cushions 110 by, for example, forming a hole (not shown) by puncturing each cushion 110 (see step 240 and FIG. 1C). The hole punctured into each cushion 110 serves as a vent when a key is depressed.

It will be recognized that equivalent structures may be substituted for the structures illustrated and described herein and that the described embodiment of the invention is not the only structure, which may be employed to implement the claimed invention. In addition, it should be understood that every structure described above has a function and such structure can be referred to as a means for performing that function. While embodiments of the present invention have been shown and described herein, it will be obvious to those skilled in the art that such embodiments are provided by way of example only. Numerous variations, changes, and substitutions will now occur to those skilled in the art without departing from the invention.

It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of forming a keypad, the method comprising:
    providing:
        a substrate having a plurality of donut-shaped recesses located at each site of a key button for inputting user information;
        a plurality of polymer cushions each filled with an incompressible fluid;
        a flex circuit layer;
        a plurality of metal membranes;
        a plurality of plastic adhesive layers; and
        a thermoplastic elastomer layer;
    forming a plurality of switch assemblies by:
        adhering a cushion to each of the plurality of donut-shaped recesses;
        placing a flex circuit layer above all of the cushions;
        adhering the plurality of metal membranes to the flex circuit layer; and
        swaging the plurality of switch assemblies to the substrate;
    over-molding the thermoplastic elastomer layer over the plurality of switch assemblies to form a keypad; and
    deflating each of the cushions by removing the incompressible fluid such that a cavity is formed between each of the plurality of metal membranes and the flex circuit layer.

2. The method of claim 1, wherein the incompressible fluid is water.

3. A keypad comprising:
    a substrate having a plurality of donut-shaped recesses located at each site of a button for inputting user information;
    a plurality of switch assemblies formed on the substrate comprising:
        a cushion adhered in the recess;
        a flex circuit layer above the cushion;
        a plurality of metal membranes adhered to the flex circuit layer; and
    an thermoplastic elastomer layer over-molded above the plurality of switch assemblies.

4. The keypad of claim 3, wherein the thermoplastic elastomer is thermoplastic urethane.

5. The keypad of claim 4, wherein the thermoplastic urethane is TEXIN 245.

6. The keypad of claim 3, wherein the plastic layer is formed from Mylar.

* * * * *